United States Patent [19]

Jourdaine

[11] Patent Number: 5,071,692
[45] Date of Patent: Dec. 10, 1991

[54] HEATED LAMINATED GLAZING

[75] Inventor: Loïc Jourdaine, Hemvillers, France

[73] Assignee: Saint-Gobain Vitrage International, Courbevoie, France

[21] Appl. No.: 584,070

[22] Filed: Sep. 18, 1990

[30] Foreign Application Priority Data

Sep. 18, 1989 [FR] France .................. 89 12170

[51] Int. Cl.⁵ .................................. B32B 9/00
[52] U.S. Cl. ........................ 428/192; 428/195;
 428/204; 428/207; 428/426; 428/427; 428/432;
 428/433; 428/457; 428/461
[58] Field of Search ............... 219/203; 428/426, 427,
 428/432, 433, 457, 461, 192, 197, 195, 204, 207

[56] References Cited

U.S. PATENT DOCUMENTS

| | | | |
|---|---|---|---|
| 3,398,040 | 8/1968 | Allen et al. | 428/426 |
| 3,623,906 | 11/1971 | Akeyoshi et al. | 219/203 |
| 3,652,370 | 3/1972 | Motai | 428/427 |
| 4,010,304 | 3/1977 | Cohen | 428/213 |
| 4,017,661 | 4/1977 | Gillery | 428/500 |
| 4,154,638 | 5/1979 | Franz et al. | 156/326 |
| 4,294,881 | 10/1981 | Meyer et al. | 428/334 |

FOREIGN PATENT DOCUMENTS

| | | |
|---|---|---|
| 0241337 | 10/1981 | European Pat. Off. |
| 1205271 | 9/1970 | United Kingdom |
| 8801230 | 2/1988 | World Int. Prop. O. |

Primary Examiner—Patrick J. Ryan
Attorney, Agent, or Firm—Oblon, Spivak, McClelland, Maier & Neustadt

[57] ABSTRACT

A laminated glazing includes a support (1) of glass and-/or plastic and a plastic sheet (5) having at least one layer of thermoplastic material, particularly a polyurethane layer. The glazing further includes a colored enamel border (2), an electroconductive coating (3) and electric power lead-in strips (4). Application is to the so-called heated laminated safety glazings.

16 Claims, 2 Drawing Sheets

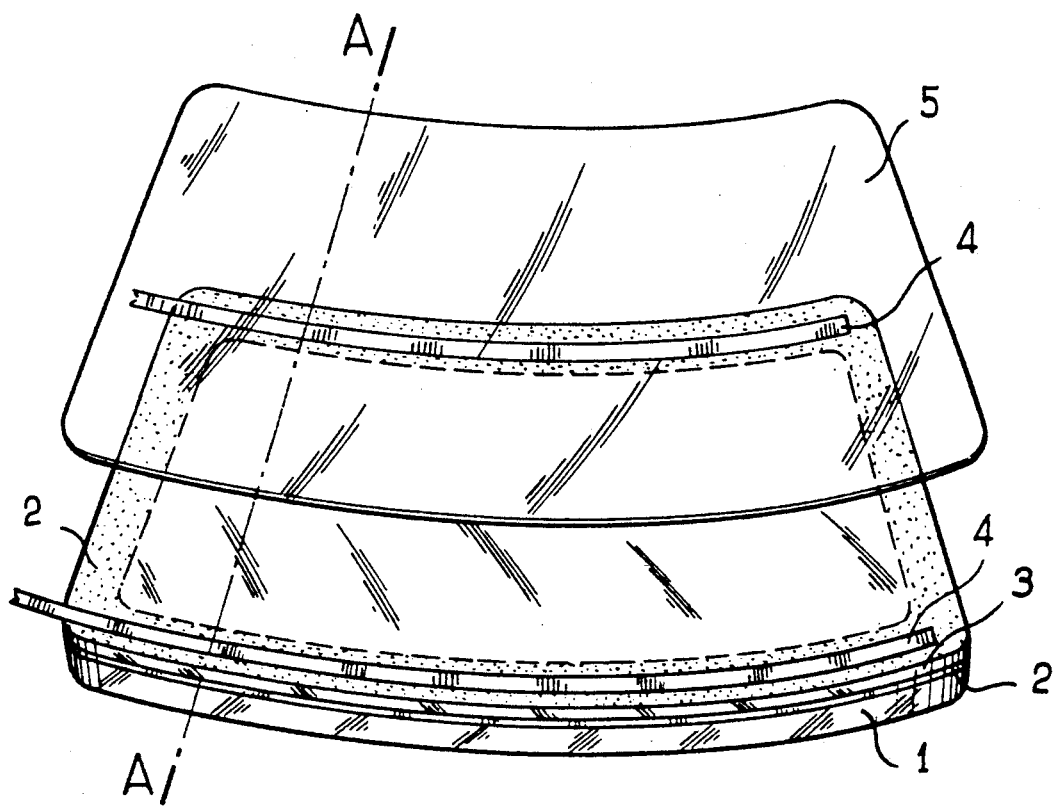
FIG_1
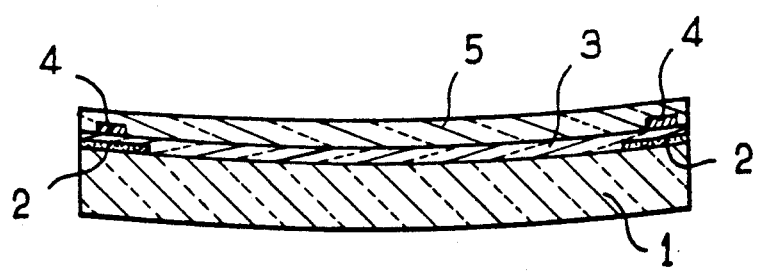
FIG_1a
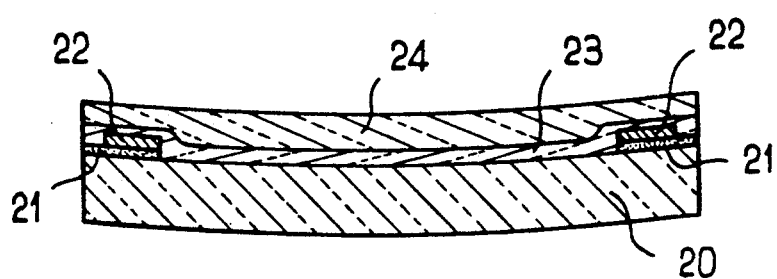
FIG_2

HEATED LAMINATED GLAZING

BACKGROUND OF THE INVENTION

1. Field of the Invention

This invention relates to a heated laminated glazing, in particular a laminated glazing comprising a monolithic or laminated support, of glass and/or plastic, and a transparent plastic sheet comprising at least one polyurethane layer, particularly a polyurethane layer exhibiting energy-absorbing properties.

2. Description of the Related Art

Transparent plastic sheets, able to be applied by pressure when hot to a face of a laminated glazing (support), have already been described, particularly in French patent No. 2 398 606. According to this patent, the sheet comprises two layers, one formed by a thermoplastic material exhibiting energy-absorbing properties and adhering to the surface of the support of glass or plastic and the other being formed by a thermosetting layer exhibiting antilaceration and resilience (i.e., self healing) properties.

These glazings can be used particularly as windshields or rear windows of motor vehicles or as glazings for buildings. The glazings, when used in motor vehicles, are generally attached by gluing in the window opening of the vehicles. To protect the adhesive, used to attach the glazings, from ultraviolet radiation and to make it invisible from the outside, the face of the laminated support covered by the thermoplastic layer generally carries on its periphery an enameled border, as indicated in French patent No. 2 595 983.

These glazings are conventionally not heated. The usual heated glazings are those laminated glazings with two glass plates between which are inserted a transparent plastic sheet, an electroconductive coating and power lead-in strips. These various elements are strongly held by the two glass plates.

It is advantageous to have laminated glazings with a single glass plate, as described above, particularly because these glazings provided only with a transparent plastic sheet in two layer form, i.e., comprising a layer of thermoplastic material and a layer of thermosetting material, offer advantages relative to the laminated glazings with two glass plates. One of the advantages is that the laminated glazing with a single glass plate can be given very diverse, and even complex, shapes by bending, due to the fact that a single glass plate is to be treated. In the case of laminated glazings with two glass plates, two plates must be bent and obtaining shapes perfectly fitting one another is not an easy achievement.

One of the problems posed by the heated laminated glazings with a single support is their mechanical stability, since the various intermediate elements are held by only one support, such as glass, and a plastic sheet.

SUMMARY OF THE INVENTION

This invention therefore has as an object a heated laminated glazing which is mechanically resistant, comprising a single support, for example of glass, and a transparent plastic sheet comprising at least one polyurethane layer, preferably with an energy-absorbing property, to be used as a so-called safety glazing.

A laminated glazing according to the invention is formed by a plate-like monolithic or laminated support, of glass and/or of plastic, exhibiting on one of its faces a colored enameled border. An electroconductive coating is adhered onto the one face of the support. Electric power lead-in means are in electrical communication with the coating and a transparent plastic sheet comprising at least one polyurethane layer is adhered onto the coating.

In particular, the support can be of clear or tinted glass.

The enamel border can consist of an electrically conductive material.

The electric power lead-in means can be formed by conductive strips, particularly of silver, silk-screened, and/or by metal foils.

The electroconductive coating can comprise one or more electroconductive layers.

The plastic sheet can be a two-layer sheet comprising one layer of thermoplastic material with an energy-absorbing property, and one thermosetting layer with antilaceration and resilience properties.

The supports which are useful for the glazings according to the invention can consist of single glass sheets or else of laminated glasses formed by glass sheets connected to one another by a plastic insert layer. The supports can also be of plastic such as polycarbonate, acrylic polymers, vinyl polychloride, polystyrene, or cellulose esters.

When the support is of glass, it can be formed by a soda lime silica glass conventionally used for automobile glazings and for buildings. It can be a clear glass, i.e., not tinted, exhibiting a significant light transmission, for example greater than 90% at a thickness of 4 mm. It can also involve a glass tinted through its entire thickness and able to provide increased summer comfort for the passengers of the vehicle or room equipped with such glass, because of its small energy transmission factor. Generally, for the glazings for automobiles, the glass constituting the support is chosen to meet government regulations, e.g., a glass having a light transmission ($T_L$) of at least 75% or 70% according to the regulations.

As tinted glass, so-called "TSA" glass containing $Fe_2O_3$ can be used in proportions by weight on the order of 0.55 to 0.62%, FeO for about 0.11 to 0.16%, which leads to an $Fe^{2+}/Fe$ ratio on the order of 0.19 to 0.25, with CoO of less than 12 ppm and even preferably less than 10 ppm. As a result, for example, for a glass thickness of 3.85 mm light transmission ($T_L$) is raised close to 78%, and energy transmission factor ($T_E$) is relatively low and close to 60%, which leads to a $T_L/T_E$ ratio on the order of 1.30.

As the tinted glass, in particular when the regulation calls for only a 70% light transmission, a glass which is a little more tinted than the "TSA" but exhibits a light transmission which is a little weaker than "TSA", namely a "$TSA^{2+}$," can also be used.

This "$TSA^{2+}$" is tinted by the same oxides as above but in slightly different proportions.

Thus, for "$TSA^{2+}$" the metal oxide proportions are as follows:

$Fe_2O_3$: approximately between 0.75 and 0.90%
FeO: approximately between 0.15 and 0.22% or $Fe^{2+}/Fe$ = about 0.20
CoO: less than 17 ppm and even preferably less than 10 ppm.

For this glass "$TSA^{2+}$" of 3.85 mm thickness, the following properties result:

$T_L$: on the order of 72%
$T_E$: on the order of 50% which leads to a $T_L/T_E$ ratio on the order of 1.40 or 1.50.

The electroconductive coating can be formed essentially by a metal monolayer or by metal oxide or oxides, for example, a doped layer of tin oxide, a layer of indium tin oxide (ITO). The electroconductive coating can also consist of several thin layers forming a stack essentially comprising a layer of conductive metal such as silver, inserted between two dielectric layers, such as tin oxide, as is described, for example, in European patent application A-230 188. These layers can be obtained by different methods of forming thin layers, for example vacuum method (heat evaporation, cathode sputtering, magneton ... ), pyrolysis (from compounds in solution or suspension form, in powder form) or tempering.

Particularly preferred electroconductive coatings are pyrolyzed ITO layers obtained from powdered compounds (tin compound such as dibutyltin oxide and indium compound, in particular indium formate), described, for example, in Pat. Nos. EP-A-192 009 and FR 2 625 754.

These layers can be formed by using devices such as those described in European Pat. Nos. 125 513, 130 919, 191 258, 189 709 and 188 962.

These layers, in addition to their homogeneity, exhibit good electrical properties and are mechanically stable.

Advantageously, the ITO layer has a thickness on the order of 180 nm, which gives it a resistance per square meter on the order of 10 ohms. It can also have a thickness of at least 330 nm, which gives it a resistance per square meter which is equal or less than 5 ohms. Preferably, the ITO layer has a thickness of 350–380 nm which makes it possible for it to exhibit a resistance per square meter on the order of 4.5–4.0 ohms.

For these thicknesses, the ITO layer has a blue-green or green color in reflection, a color which is valued for motor vehicles.

Depending on the glazings desired, the thickness, the color of the glass support, the associated plastic materials and/or the thickness of the ITO layer can be varied.

To improve the electrical conduction of the thin electroconductive ITO layers, they can be subjected, after deposition, to a heat treatment, as is described, for example, in European patent applications A-192 009 and A-278 836.

This heat treatment of the layer can be performed, under a normal or reduced pressure, in an atmosphere which preferably is neutral or reducing, for example, under atmosphere of $H_2$ or of $N_2$ or even under an $H_2+H_2$ mixture. This treatment can again be performed under vacuum. This heat treatment is performed at a temperature lower than that of the deposition of the electroconductive layer, namely at a temperature lower than 400° C. Preferably, the treatment temperature is between 250° and 350° C.

Thus, an automobile glazing usable in the invention can be made with a "TSA" glass support of a thickness of 3 mm, covered by an ITO layer of a thickness on the order of 350–380 nm or on the order of 180 nm. With the layer thickness of 180 nm, the "TSA" glass thickness can be slightly larger to reach up to 3.5 or 4 mm. A glazing with color very slightly green in transmission, green in reflection, and with a $T_L$ compatible with automobile regulations (more than 75%), and a $T_L/T_E$ on the order of 1.40, results from this.

If it is desired to use "TSA$^{2+}$" glass in place of "TSA" glass, while having light transmission coefficients compatible with the regulations, a "TSA$^{2+}$" glass support of 3 mm of thickness and a layer of ITO having a thickness of 180 nm can be selected. A coefficient $T_L$ greater than 70%, a ratio $T_L/T_E$ on the order of 1.50, i.e., a small energy transmission and therefore an improved summer comfort, then result for the finished glazing.

Of course, glazings with glass thicknesses less than those set forth above are, a fortiori, possible since this makes it possible to increase the light transmission, and consequently to meet the regulations.

The deposition of enamel on the periphery of the support of the glazing is used to mask, from the outside, the power lead-ins as well as the optional glue used to attach the glazings in the window opening of the body of the automobile.

It is also used to protect the glue from the harmful effects of the sun. Any known enamel can be used. It is preferably of a dark color, advantageously black. Its thickness can vary. It is, in general, from 15 to 25 microns thick and can reach 40 microns. The enamel layer deposited by silk-screening is dried, for example, by exposure to ultraviolet radiation, infrared radiation or microwaves. Then, it is generally annealed before application of the following layers, particularly when the electroconductive coating itself, or the stack of thin layers to which it belongs, and which comes into contact with this enamel layer, is deposited under vacuum.

When the electroconductive coating is deposited by pyrolysis after the forming of the enamel layer, the baking of the enamel is performed during the heating phase of the glass support which is generally brought to a temperature on the order of 600° C. to make possible the pyrolysis under good conditions.

When the enamel layer, after drying, is covered by a conductive silver strip, the baking of the enamel layer and the conductive strip can be performed simultaneously.

If the conductive silver strip is formed from a composition which is incompatible with the colored enamel, it may be desirable to bake the enamel layer before applying the conductive silver strip, particularly because the silver can diffuse in the enamel layer, which is porous.

The enamel layer optionally can be electrically conductive.

To feed the electroconductive coating electrically, power lead-in strips can be used which can be conductive strips of the silk-screened type with a silver base, for example.

The conductive strips, of the type with a silver base, which are deposited by silk-screening, are known, particularly in the heated laminated glazings generally used in automobiles, and which comprise two glass sheets between which an inserted plastic sheet, power lead-in strips and an electroconductive coating are generally placed in order. These conductive strips with a silver base, of a thickness able to vary generally between 15 and 30 microns, are deposited on the enamel border by silk-screening from, for example, a suspension of finely divided metallic silver and a frit with a low melting point in an organic binder. These conductive silver strips also can act as a limit of the enamel, being partly on the enamel and partly on the electroconductive coating.

After drying, for example by exposure to ultraviolet or infrared radiation, the conductive strip with a silver base is baked to give it its final solidity.

Metal foils also can be used to electrically feed the electroconductive coating.

These metal foils are generally placed between the electroconductive coating and the plastic sheet. They can be attached to the electroconductive coating by an electrically conductive adhesive layer. They can also be attached directly to the plastic sheet, for example by welding. In this case, the metal foils are put into contact with the electroconductive coating during the assembly, by hot pressing of the plastic sheet and the support.

The attachment of the foils to the plastic sheet can be obtained by spaced spot welding, assuring the integration of the foils on the plastic sheet, advantageously followed by a continuous smoothing of the foils over the entire length with the hot bit of a soldering iron, to reinforce the integration and to assure the surface evenness of the foils.

Further, keeping the metal foils in contact with the electroconductive coating can be reinforced by an encapsulation of the glazing. Thus a frame is made with the glazing *in situ* by casting or injection of organic materials in a mold. This frame can also be used to reinforce the electrical insulation and, further, to route within it the metal foils to a desired location for their output from the glazing.

These metal foils have an end which extends outside of the glazing to make possible their connection to the electric source. Advantageously, the ends of the foils are provided with an electrical insulation to prevent any short circuit.

Generally, the metal foils are placed horizontally, one close to the upper edge of the glazing, particularly of the windshield, the other close to the lower edge of the glazing.

Advantageously, the metal foils are placed at a distance from the edges of the glazing, for example by at least about 5 mm, to prevent any risk of delamination of the laminated glazing. However, if the glazing is encapsulated, this risk of delamination is small, and the power lead-in strips can be placed nearer the edge of the glazing.

One of the metal foils being placed near the upper edge of the glazing and the other near the lower edge, their ends are separated by the width of the glazing. It can be desirable that the ends of the foils be approximately in the same location, to facilitate the connection to the electric source. For this purpose, one of the foils can be extended and this extension can be made to pass onto the other face of the plastic sheet, through a notch, and is routed flat against this other face of the plastic sheet, for example by spaced spot welding, along the edge of this sheet in a direction approximately perpendicular to the two horizontal foils placed on the upper and lower edges of the glazing at the location provided for the output of the ends of the foils. In this case, the extension of the foil is insulated. The ends of the two metal foils, insulated from one another, are then in place to produce the glazing approximately in the same location. Of course, the same operation can be performed on the ends of the two metal foils if the common output is not in the extension of one of the power lead-in strips.

For the ends of the metal foils to be approximately at the same output location, it is also possible to attach the extension of the metal foil to the same face of the plastic sheet as that carrying the horizontal branches of the foils and to not deposit the electroconductive coating on the edge of the glazing corresponding to the path for routing the extension of the foil whose end is desired to bring into the vicinity of the output end of the other foil, for example, by masking during the deposition of this coating. Thus, on this edge of the glazing, the extension of the metal foil will not be in contact with the electroconductive coating but will be directly in contact with the decorative enamel.

In another embodiment, when the extension of the metal foil is on the same face of the plastic sheet as the horizontal branches of the foils, an insulating layer is placed between the electroconductive coating (then deposited over the entire surface of the support) and the extension of the metal foil.

As metal foils, copper foils, preferably tinned, are advantageously used. These foils generally have a thickness on the order of one tenth of a millimeter, for example about 80 microns, and a width of about 0.5 to 1 cm, for example 0.8 cm. Tinned copper foils, in the form of 0.8 cm width and about 80 microns thickness, have a resistance per meter of length of about 0.025 ohm.

The transparent plastic sheets formed by two layers of thermoplastic material and thermosetting material and useful for achieving the invention are described particularly in European patent application 54 491, 132 198, 133 090, as well as in French patent FR 2 398 606, already mentioned.

The plastic sheet can also exhibit a refraction index greater than that of the air and closer to that of the electroconductive layer, particularly, of the ITO layer, than the index of the air, as it is described in French patent application FR 88 10 138 filed on July 27, 1988, in the name of the applicant. Such a plastic sheet, when it adheres to the electroconductive layer, particularly an ITO layer obtained by pyrolysis of powders, makes it possible to make the possible defects (spotting, deformation) of the layer invisible.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is an exploded perspective view of a first embodiment of the invention;p

FIG. 1a is a section taken along direction A—A of the glazing of FIG. 1;

FIGS. 2 to 4 correspond to FIG. 1a, but show in sections, alternate embodiments according to the invention.

DETAILED DESCRIPTION OF THE PREFERRED EMBODIMENTS

Figure 3:
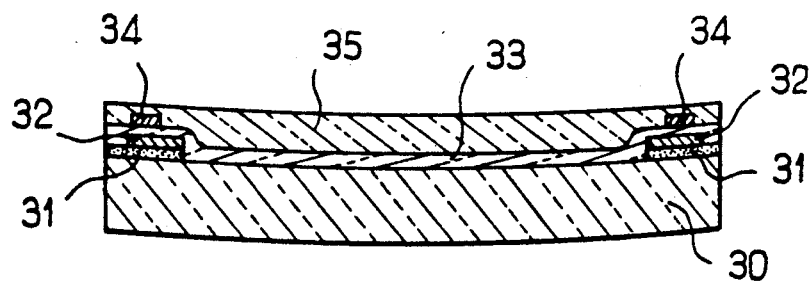

The glazing shown in FIGS. 1 and 1a comprises a glass plate (1), a decorative border (2) of colored enamel, preferably black, an electroconductive coating (3) and electric power lead-in strips in the form of metal foils (4), particularly of tinned copper. These foils (4) are placed in the zone corresponding to the border of black enamel (2) on the upper and lower edges of the glazing. The glazing further comprises a plastic sheet (5) comprising at least one polyurethane layer such as described above.

For the production of such a glazing, support (1) of clear or tinted glass, as described above, is precut in dimensions desired for the final glazing.

On the edge of the glass support is deposited black enamel layer (2) by silk-screening to form a decorative frame intended to hide, from the outside, the power lead-in strips and the glue or adhesive used to attach the glazing to the window opening of the body of the automobile. Enamel layer (2) is dried by exposure to ultraviolet radiation, infrared radiation or to microwaves. This enamel layer (2) is annealed, particularly if electroconductive coating (3) is then deposited under vacuum. If electroconductive coating (3) is formed by pyrolysis, the annealing of enamel (2) takes place during the heating phase of the support up to a temperature of about 600° C., necessary for the deposition by pyrolysis of the electroconductive coating.

If the glazing is to be bent, particularly for use in automobiles, the glass support is bent to the desired shape at a temperature of about 600° C. after the deposition of enamel layer (2) if electroconductive layer (3) is to be deposited under vacuum. If electroconductive coating (3) consists of the ITO deposited by pyrolysis, the bending can take place after the deposition of this coating. Actually, such an ITO layer offers the advantage of being very stress resistant and able to accommodate the bending without damage.

If the electroconductive coating consists of ITO, it can then be put through a heat treatment in a reducing atmosphere, as described above, to improve its electrical conduction characteristics.

Metal foils (4) used as power lead-in means in this embodiment of FIGS. 1 and 1a are attached as described above, either to electroconductive coating (3), for example, by a conductive adhesive, or else on plastic sheet (5) by welding.

Glass support (1) provided with its various layers then is assembled in a plastic sheet (5) as described above when hot and under pressure, in a known manner.

FIG. 2 is a view in section of another embodiment of a glazing according to the invention. It comprises a support (20) of clear or tinted glass for example, an enamel border (21), preferably black, deposited by silk-screening on the periphery of the glass support, a conductive layer with a silver base (22) deposited by silk-screening on the enamel border (21) and slightly set back relative to the edge of the glass support, an electrically conductive coating (23) and a plastic sheet (24) comprising at least one polyurethane layer as defined above.

The stages for the production of such a glazing can be those described above for the glazing of FIG. 1, particularly for the deposition of enamel border (21) and electroconductive coating (23) and the assembly with plastic sheet (24).

Unlike the glazing of FIGS. 1 and 1a, the electric power lead-in strips are, in this embodiment of FIG. 2, conductive strips with a silver base (22) instead of copper foils. In this case, conductive strip (22) with a silver base, deposited by silk-screening from a composition as described above, can be applied after the baking of black enamel (21). It also can be deposited on black enamel (21) immediately after the drying of the enamel, the baking of enamel (21) and conductive strip (22) then taking place simultaneously. As indicated for the glazing of FIGS. 1 and 1a, following the application of electroconductive coating (23), the baking of conductive strip with a silver base (22) and optionally that of black enamel (21) takes place after the drying of conductive silver strip (22) (coating deposited under vacuum) or else during the temperature rise of the support for the pyrolysis of the components of the electroconductive coating.

FIG. 3 shows another embodiment according to the invention. It comprises a support (30) of clear or tinted glass for example, a border of preferably black enamel (31), power lead-in strips (32) in the form of conductive silver strips deposited by silk-screening on enamel layer (31) and in a position slightly set back toward the inside relative to the edge of the glazing, an electroconductive coating (33), metal foils (34) applied in a zone corresponding to that of conductive silver strips (32) and a plastic sheet (35) comprising at least one polyurethane layer. In this case, the face of the foils oriented toward the plastic sheet can be, for example, painted in black to hide the power lead-in strips from the inside of the vehicle provided with this glazing.

The deposition of enamel layers, of conductive silver strips and of the electroconductive coating can be performed as for the glazing of FIG. 2. The metal foils, as indicated above for the glazing of FIGS. 1 and 1a, can be attached to a face of plastic sheet (35) before its assembly with the glass support and its various layers or else directly on electroconductive coating (33) by a conductive adhesive.

Figure 4:
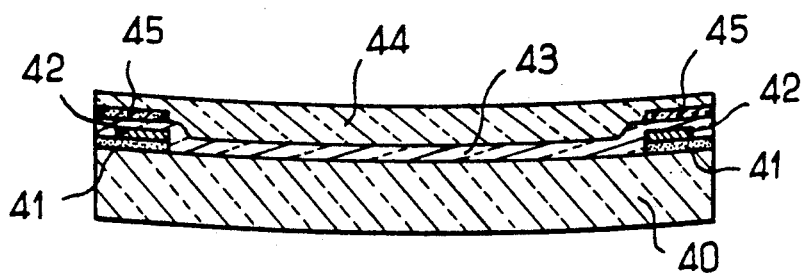

FIG. 4 represents another embodiment of a glazing according to the invention.

This glazing comprises the elements described in FIG. 2, i.e., a support (40), of clear or tinted glass, for example, a colored enamel border (41), preferably black, deposited by silk-screening on the support, conductive silver strips (42), an electroconductive coating (43) and a plastic sheet (44). This glazing further comprises a colored adhesive layer (45), preferably black, to hold electroconductive coating (43) and plastic sheet (44). This black adhesive layer (45), deposited in a zone corresponding to the zone occupied by electric power lead-in strips (42), is also used to hide the view of these conductive silver strips on the side of the face of the glazing carrying the transparent plastic sheet.

Although other embodiments have not been described as comprising this black adhesive layer, it is understood that they can contain it if the use of the glazing being considered requires it.

Figure 5:
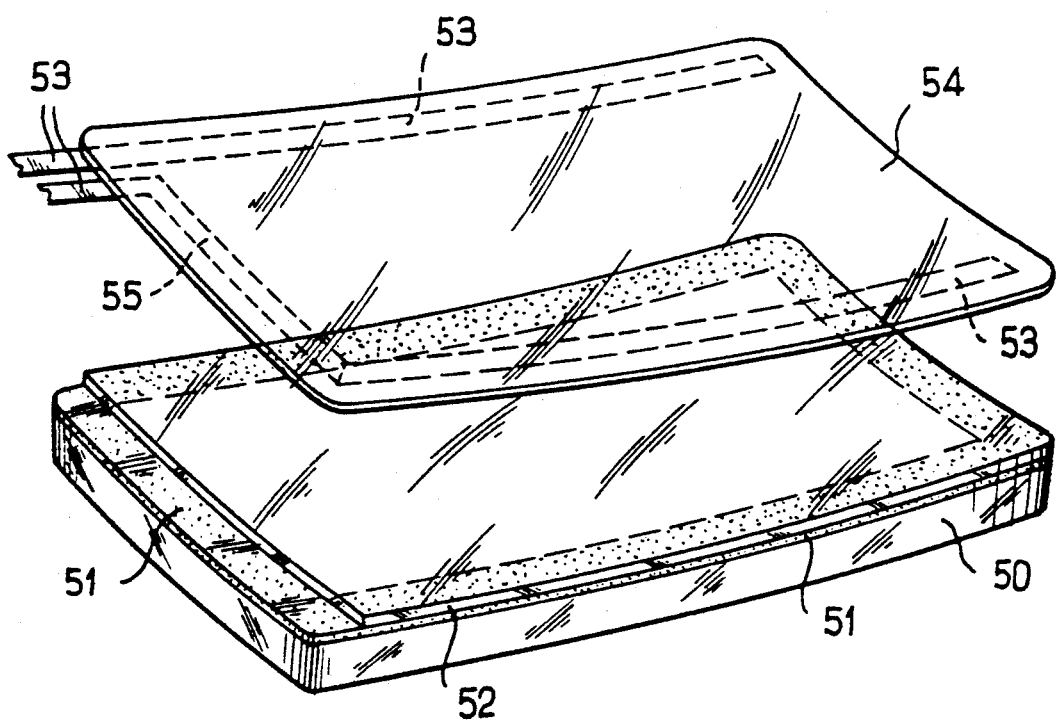
FIG. 5 is an exploded perspective view of a glazing according to the invention provided with its power lead-ins.

FIG. 5 represents, in exploded view and in perspective view, a glazing in which the electric power lead-in strips are metal foils, of which one of the latter is extended so that the ends of the two foils come out of the glazing at approximately the same location.

In this FIG. 5, support (50) of clear or tinted glass, for example, carries a colored enamel border (51), preferably black, and an electroconductive coating (52). Plastic sheet (54) not yet assembled with support (50) is provided with power lead-in strips (53) in the form of metal foils, attached to the surface of the sheet by spaced spot welding, for example.

As described above, to bring the ends of these foils approximately to the same location to facilitate their connection to the electric source, one of the foils, for example that located along the lower edge of the glazing, has an extension (55) which runs along the edge of the plastic sheet in a direction approximately perpendicular to the branches of the two metal foils occupying a horizontal position along the upper and lower edges of the glazing, up to the location provided for the output of the ends of the two foils. In this case, the zone of the glass support corresponding to that of the attachment of this extension (55) is not covered by electroconductive coating (52).

As indicated above, when the electroconductive coating covers the entire surface of support (50), an insulating layer should be placed between the coating and the extension of the foil.

This embodiment shown in FIG. 5 can be used for any glazing embodiment in which the power lead-in strips consist of metal foils.

As indicated above, but not shown in the figures, extension (55) of one of the metal foils can go through plastic sheet (54) via a notch and be attached to the other face of the sheet, for example by spaced spot welding. In this case, the extension of the foil is covered by an insulating material.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A laminated glazing comprising:
   a single plate support having a colored enamel border on one face thereof;
   an electroconductive coating adhered onto said one face of said support;
   electric power lead in means in electrical communication with said electroconductive coating; and
   a plastic sheet having at least one polyurethane layer adhered onto said electroconductive coating and covering said lead in means.

2. The laminated glazing of claim 1, wherein said electric power lead-in means extends adjacent two opposite edges of said glazing and is one selected from the group consisting of a metal foil and a silk screened strip.

3. The laminated glazing of claim 2, wherein said lead-in means comprise silk-screened strips and have a silver base.

4. The laminated glazing of claim 1, wherein said electroconductive coating is one selected from the group consisting of a metal and a metal oxide.

5. The laminated glazing of claim 4, wherein said electroconductive coating is one selected from the group consisting of a layer of doped $SnO_2$ and a layer of indium tin oxide.

6. The laminated glazing of claim 1, wherein said coating comprises a layer of silver sandwiched between two dielectric layers.

7. The laminated glazing of claim 2, wherein said lead-in means comprise copper foils.

8. The laminated glazing of claim 1, wherein the plastic sheet comprises a layer of thermoplastic material with an energy-absorbing property and a layer of thermosetting material exhibiting antilaceration and resilience properties, at least one of said layers comprising a polyurethane layer.

9. The laminated glazing of claim 1, wherein said support comprises a TSA or $TSA^{2+}$ type tinted glass support.

10. The laminated glazing of claim 1, wherein said support comprises a glass support supporting, in order, the enamel border, the electroconductive coating, a copper foil placed over the enamel border and the plastic sheet.

11. The laminated glazing of claim 1, wherein said support comprises a glass support supporting, in order, the enamel border, a silk-screened conductive strip with a silver base placed on the enamel border, the electroconductive coating and the plastic sheet.

12. The laminated glazing of claim 11, including a copper foil placed between the electroconductive coating and the plastic sheet at a location over the enamel border.

13. The laminated glazing of claim 1, wherein the enamel border is electrically conductive.

14. The laminated glazing of claim 1, including a colored adhesive placed in contact with the plastic sheet over the power lead-in means and in the zone corresponding to the location of the power lead-in means or in direct contact with the power lead-in means.

15. The laminated glazing of claim 1, including a plastic section covering an edge of the glazing to hold the elements constituting the glazing.

16. The laminated glazing of claim 15, wherein the plastic section is an encapsulation frame.

* * * * *